United States Patent
Taylor

(10) Patent No.: US 9,410,630 B1
(45) Date of Patent: Aug. 9, 2016

(54) SEALING MEMBER FOR USE IN NON-SIMMERING CLEAN SERVICE RELIEF VALVE

(71) Applicant: Taylor Innovations, L.L.C., Oklahoma City, OK (US)

(72) Inventor: Julian S. Taylor, Oklahoma City, OK (US)

(73) Assignee: Taylor Innovations LLC, Oklahoma City, OK (US)

(*) Notice: Subject to any disclaimer, the term of this patent is extended or adjusted under 35 U.S.C. 154(b) by 0 days.

(21) Appl. No.: 14/069,659

(22) Filed: Nov. 1, 2013

Related U.S. Application Data

(60) Provisional application No. 61/819,888, filed on May 6, 2013.

(51) Int. Cl.
*F16L 17/06* (2006.01)
*F16K 3/24* (2006.01)

(52) U.S. Cl.
CPC ..................... *F16K 3/243* (2013.01)

(58) Field of Classification Search
CPC .......... F16J 15/34; F16J 15/56; F16L 23/036; F16L 23/22; F16K 17/003; F16K 17/025; F16K 17/0493; F16K 27/003; Y10T 29/49405; Y10T 29/49885; Y10T 29/4973
USPC ............ 137/71, 72, 15.19, 454.2, 68.17, 461, 137/511, 616.7; 251/43, 363, 364, 324, 251/367, 362, 333, 214; 277/608, 609
See application file for complete search history.

(56) References Cited

U.S. PATENT DOCUMENTS

| | | | |
|---|---|---|---|
| 854,135 A | 5/1907 | Whittemore | |
| 935,387 A | 9/1909 | Mastin | |
| 1,203,762 A | 11/1916 | Mastin | |
| 1,616,088 A | 2/1927 | Kinzel | |
| 1,940,924 A | 12/1933 | Taylor | |
| 2,249,127 A | 7/1941 | Goetze | |
| 2,327,837 A | 8/1943 | Williams | |
| 2,686,534 A | 8/1954 | Montelius | |
| 2,789,844 A * | 4/1957 | Kessler | 285/336 |
| 2,828,238 A | 8/1958 | Batson et al. | |
| 2,892,644 A * | 6/1959 | Collins | F16J 15/32 251/324 |
| 2,898,167 A | 8/1959 | Tanner | |
| 2,940,803 A | 6/1960 | Phillips | |
| 3,110,471 A * | 11/1963 | Kuhles | 251/318 |
| 3,207,179 A | 9/1965 | Klagues | |
| 3,290,003 A * | 12/1966 | Kessler | 251/318 |
| 3,331,385 A | 7/1967 | Taylor | |
| 3,405,730 A | 10/1968 | Baumann | |
| 3,540,285 A | 11/1970 | Nicolau et al. | |
| 3,603,602 A | 9/1971 | Padula | |
| 3,762,685 A * | 10/1973 | Curran | F16K 27/02 137/454.6 |

(Continued)

*Primary Examiner* — John K Fristoe, Jr.
*Assistant Examiner* — Minh Le
(74) *Attorney, Agent, or Firm* — Hall Estill Attorneys at Law

(57) ABSTRACT

Apparatus for forming a fluidic seal such as in a clean service relief valve. In accordance with some embodiments, a ring-shaped sealing member has an annular main body portion with an innermost surface at an innermost diameter, an outermost surface at an outermost diameter and opposing top and bottom flat surfaces which respectively extend between the innermost surface and the outermost surface. An annular first projection extends away from the top flat surface in a first direction, and an annular second projection extends away from the bottom flat surface in an opposing second direction.

12 Claims, 4 Drawing Sheets

(56) References Cited

U.S. PATENT DOCUMENTS

| | | | |
|---|---|---|---|
| 3,819,211 A | 6/1974 | Knox | |
| 3,873,102 A * | 3/1975 | Lotze et al. | 277/319 |
| 3,990,711 A * | 11/1976 | Hill | F16J 15/32 277/451 |
| 4,039,197 A * | 8/1977 | Schmidt | F16J 15/3232 277/550 |
| 4,158,453 A | 6/1979 | Reedy | |
| 4,530,373 A | 7/1985 | Bork et al. | |
| 4,531,532 A * | 7/1985 | Zimmerly | 137/15.06 |
| 4,534,096 A | 8/1985 | Garcia, Jr. et al. | |
| 4,540,183 A | 9/1985 | Schneider et al. | |
| 4,570,665 A * | 2/1986 | Zimmerly | 137/240 |
| 4,755,244 A | 7/1988 | Allison | |
| 4,901,761 A | 2/1990 | Taylor | |
| 4,915,355 A | 4/1990 | Fort | |
| 4,948,096 A | 8/1990 | Alderman | |
| 5,002,088 A | 3/1991 | Engelhardt et al. | |
| 5,033,756 A | 7/1991 | Sixsmith et al. | |
| 5,152,500 A * | 10/1992 | Hoobyar et al. | 251/269 |
| 5,168,895 A | 12/1992 | Voss | |
| 5,171,025 A * | 12/1992 | Stoll | F16J 15/3252 137/248 |
| 5,172,727 A * | 12/1992 | Stoll | F16J 15/3252 137/625.66 |
| 5,243,929 A * | 9/1993 | Brown et al. | 116/276 |
| 5,265,652 A * | 11/1993 | Brunella | 141/59 |
| 5,338,005 A * | 8/1994 | Stoll | F16J 15/3204 251/214 |
| 5,407,214 A | 4/1995 | Lew et al. | |
| 5,617,893 A | 4/1997 | Webster | |
| 5,743,535 A | 4/1998 | Hodgins | |
| 5,749,586 A * | 5/1998 | Abe et al. | 277/608 |
| 6,009,896 A | 1/2000 | Van Oosten | |
| 6,039,319 A | 3/2000 | Coonce et al. | |
| 6,045,033 A * | 4/2000 | Zimmerly | 228/189 |
| 6,058,961 A * | 5/2000 | Taylor | 137/70 |
| 6,073,969 A * | 6/2000 | Zimmerly | 285/12 |
| 6,079,752 A * | 6/2000 | Meisinger | 285/363 |
| 6,135,134 A * | 10/2000 | Taylor | 137/68.11 |
| 6,223,949 B1 * | 5/2001 | Spencer et al. | 222/140 |
| 6,279,602 B1 | 8/2001 | Bonnefous et al. | |
| 6,315,299 B1 | 11/2001 | Taylor | |
| 6,431,478 B1 * | 8/2002 | Reed et al. | 241/65 |
| 6,609,895 B2 | 8/2003 | Forthuber et al. | |
| 6,857,638 B2 * | 2/2005 | Dupont et al. | 277/608 |
| 7,390,580 B1 | 6/2008 | Dupont | 428/692.1 |
| 7,950,700 B2 * | 5/2011 | Willemstyn et al. | 285/364 |
| 8,061,382 B2 * | 11/2011 | Holden et al. | 137/542 |
| 8,240,718 B2 * | 8/2012 | Morton et al. | 285/312 |
| 8,474,480 B1 * | 7/2013 | Scantlin | 137/488 |
| 8,573,244 B2 * | 11/2013 | Taylor | 137/70 |
| 2005/0212291 A1 * | 9/2005 | Edwards | 285/364 |
| 2009/0179388 A1 * | 7/2009 | Uhlenkamp et al. | 277/608 |
| 2010/0230962 A1 * | 9/2010 | Bongiorno | 285/363 |
| 2010/0253009 A1 * | 10/2010 | Yoshitomi | 277/608 |
| 2012/0074694 A1 * | 3/2012 | Butte | 285/336 |
| 2012/0227221 A1 * | 9/2012 | Whitaker et al. | 24/459 |

\* cited by examiner

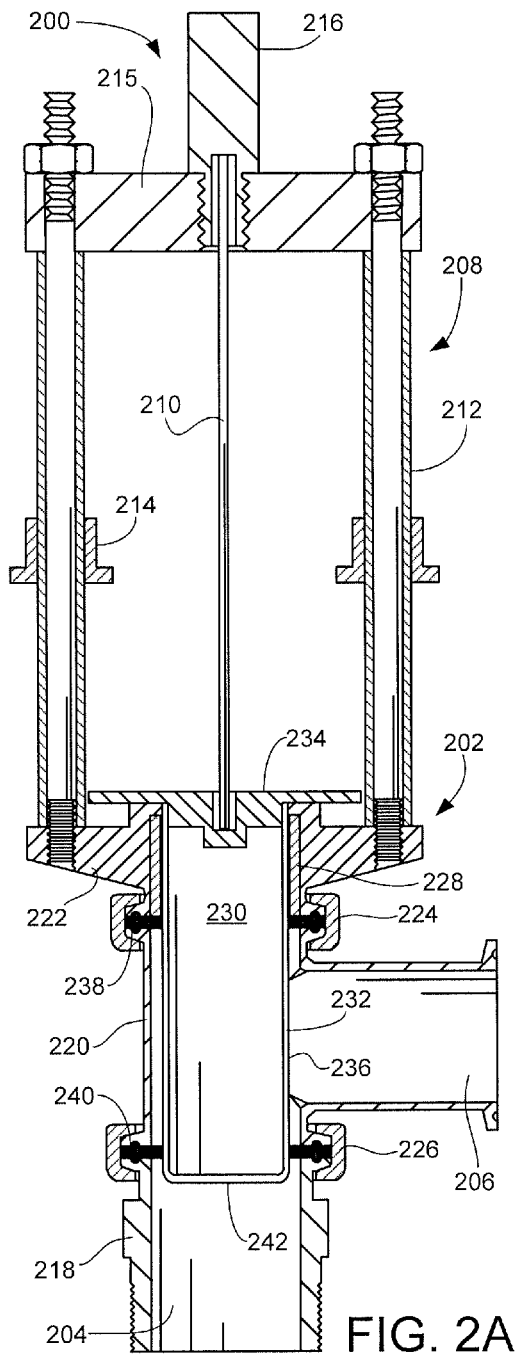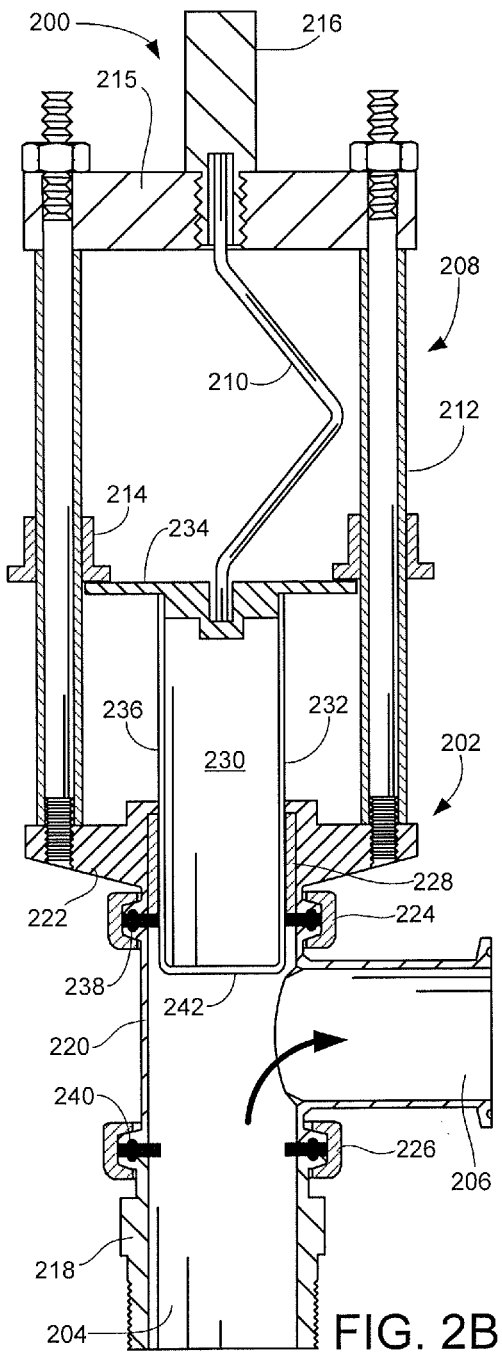

SEALING MEMBER FOR USE IN NON-SIMMERING CLEAN SERVICE RELIEF VALVE

RELATED APPLICATIONS

This application makes a claim of domestic priority to U.S. Provisional Patent Application No. 61/819,888 filed May 6, 2013, the contents of which are hereby incorporated by reference.

BACKGROUND

Clean service pressure relief valves provide overpressure relief in clean service (fluid) applications, such as the food service, dairy, pharmaceutical, medical, chemical and other industries. In such applications, the pressurized fluid is transported through a conduit network. Pressure relief valves may be disposed at appropriate locations in the network to allow a bypass path to be established in the event of an overpressure condition.

Clean service applications may be subjected to strict regulatory requirements to reduce the risk of contamination to the transported fluids. Such applications may require extensive cleaning and sanitizing operations after an overpressure condition has been experienced in the network.

SUMMARY

Various embodiments of the present disclosure are generally directed to an apparatus for forming a fluidic seal, such as in a clean service relief valve.

In accordance with some embodiments, a ring-shaped sealing member has an annular main body portion with an innermost surface at an innermost diameter, an outermost surface at an outermost diameter and opposing top and bottom flat surfaces which respectively extend between the innermost surface and the outermost surface. An annular first projection extends away from the top flat surface in a first direction, and an annular second projection extends away from the bottom flat surface in an opposing second direction.

BRIEF DESCRIPTION OF THE DRAWINGS

FIGS. 2A-2B provide cross-sectional representations of a clean service pressure relief valve in accordance with some embodiments. The valve is in a normally closed position in FIG. 2A, and in an open position in FIG. 2B.

DETAILED DESCRIPTION

Figure 1:
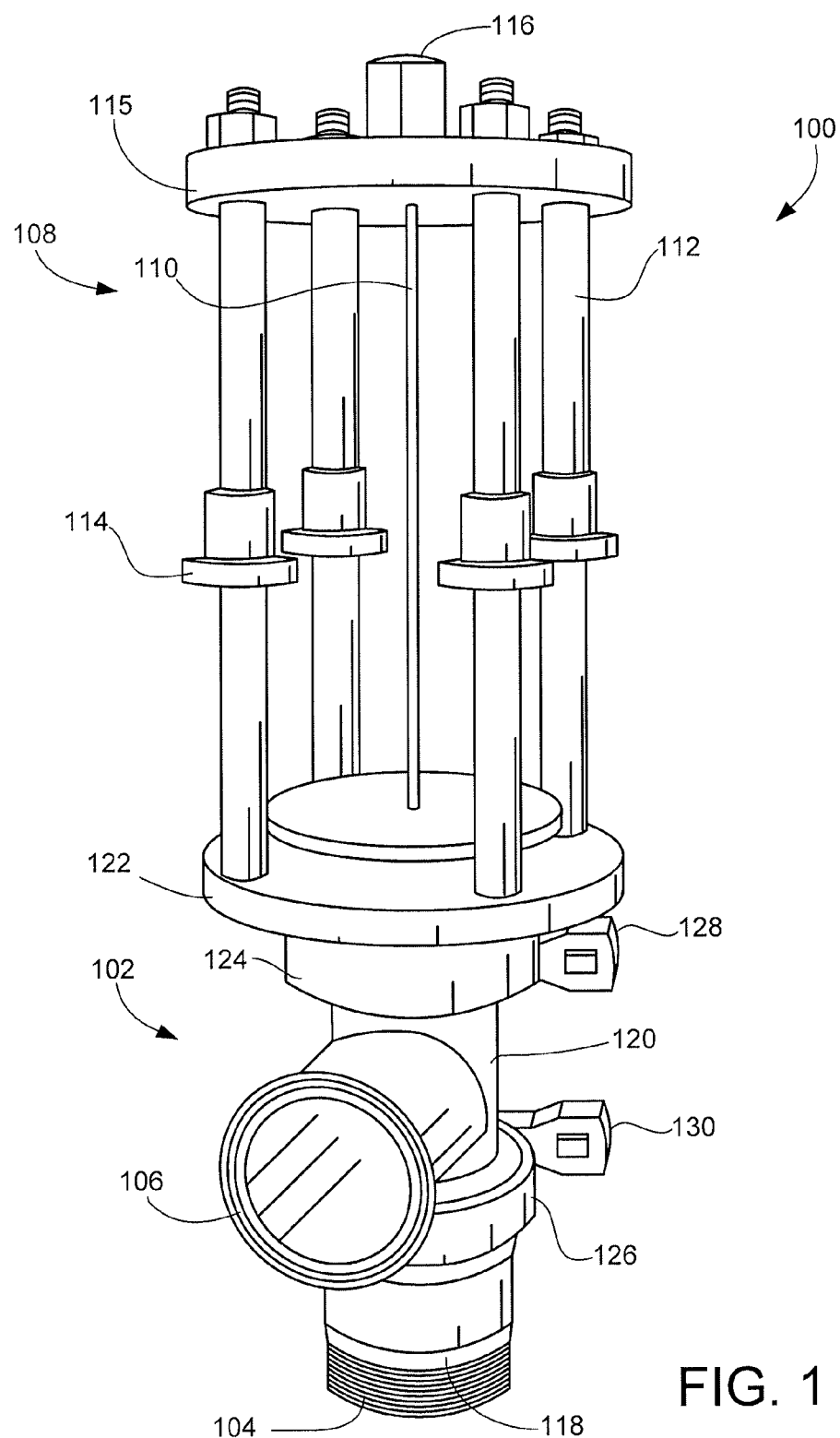
FIG. 1 is a perspective representation of a clean service pressure relief valve constructed and operated in accordance with various embodiments of the present disclosure.

FIG. 1 is a perspective representation of a clean service pressure relief valve 100 in accordance with some embodiments. The valve 100 is provided to illustrate an exemplary environment in which various embodiments can be advantageously practiced.

The valve 100 is adapted to provide overpressure relief for a clean service application in which a clean fluid is transported through a conduit network (not separately shown). General features of the valve 100 includes a main body 102, inlet port 104, bypass path outlet port 106, and a collapsible pin assembly 108 including a mechanically collapsible pin 110, standoffs 112, piston stops 114, top support plate 115 and retention nut 116.

The main body 102 is formed from separate lower, intermediate and upper housing members 118, 120 and 122. These respective members are secured together using upper and lower coupling rings 124, 126. The coupling rings are secured using respective fasteners 128, 130.

Within the main body 102 is a normally closed valve assembly (not separately shown in FIG. 1) that is in fluidic communication with the inlet port 104. Inlet pressurized fluid at the inlet port 104 provides an upwardly directed force upon the valve assembly, which is retained in the normally closed position by the collapsible pin 110.

At such time that the upwardly directed force exceeds a predetermined threshold, the pin 110 mechanically collapses in accordance with Euler's Law and the valve assembly moves to an open position. The valve assembly establishes an open bypass path to permit the fluid at the inlet port 104 to pass through the main body 102 and out the outlet port 106. Although not shown, the outlet port 106 is adapted to be coupled to downstream conduit piping to divert the overpressurized fluid to a safe location, such as a storage tank, a drain, etc.

The three-piece construction of the housing main body 102 facilitates efficient disassembly and cleaning of the valve 100 prior to return of the valve to service after an overpressure event. Details regarding these and other features will be discussed below.

FIGS. 2A-2B depict another clean service pressure relief valve 200 generally similar to the valve 100 of FIG. 1. FIG. 2A shows the valve 200 in the normally closed position, and FIG. 2B shows the valve 200 in an open position. As with the valve 100 of FIG. 1, the valve 200 of FIG. 2 includes a main body 202, inlet port 204, bypass path outlet port 206, and a collapsible pin assembly 208 including a mechanically collapsible pin 210, standoffs 212, piston stops 214, top support plate 215 and retention nut 216. It will be noted that, depending on spacing, there may be additional standoffs such as behind the pin 210, but such has been omitted from FIGS. 2A-2B for clarity of illustration.

The main body 202 is formed from separate lower, intermediate and upper housing members 218, 220 and 222. These respective members are secured together using upper and lower coupling rings 224, 226. The coupling rings are secured using respective fasteners (not shown in FIGS. 2A-2B). A cylindrical insert 228 is housed within the upper housing member 222.

A reciprocal valve assembly 230 is disposed within the main body 202. The valve assembly 230 includes a cylindrical piston member 232 attached to an upper plate 234. The upper plate 234 engages a lower end of the collapsible pin 210. The piston 232 is shown to have a cup-shaped configuration, but other configurations including a solid configuration can be used.

The piston member 230 has a cylindrical outer wall 236 that is contactingly engaged by upper and lower annular sealing members 238, 240. The upper sealing member 238 is compressingly disposed between the housing members 220, 222 by the coupling ring 224. The lower sealing member 240 is compressingly disposed between the housing members 218, 220 by the coupling ring 226.

As shown in the normally closed position of FIG. 2A, the lower sealing member 240 provides a fluid-tight seal against the outer wall 236 of the piston member 232 to isolate the inlet port 204 from the outlet port 206 while the valve 200 is in the normally closed position.

Once the pressure of the pressurized fluid at the inlet port 204 provides sufficient upwardly directed force upon a lower surface 242 of the piston member 230, the pin 210 mechanically collapses and the valve assembly 230 moves upwardly to the open position depicted in FIG. 2B. More specifically, the pin 210 collapses into a captured, bent configuration as shown in FIG. 2B responsive to the upwardly directed force upon the surface 242 exceeding the yield limit of the pin 210. The upwardly directed force is generally a function of the exposed surface area of the surface 242 and the pressure of the inlet fluid.

While a collapsible pin is shown, such is merely exemplary and not required. Other mechanisms can be used to maintain the valve 200 in the normally closed position and transition the valve to the open position, including but not limited to a spring mechanism, a rupture disc, etc. Moreover, while the valve is contemplated as constituting a normally closed valve, other configurations for a valve incorporating various aspects disclosed herein are also contemplated such as a normally open emergency shutdown valve, a flow regulating valve, etc.

The open position depicted in FIG. 2B establishes a bypass path for the pressurized fluid to pass from the inlet port 204 to the outlet port 206. The valve assembly 230 is balanced so that the force upon the piston 232 from the inlet pressurized fluid at inlet port 204 will operate to open the valve irrespective of downstream pressure (if any) at the outlet port 206. The upward movement of the valve assembly 230 is arrested by contacting engagement between the upper plate 234 and the piston stops 214. The actual amount of movement can vary as required. The valve can be alternatively configured as a pressure differential valve so that the valve transitions to the open position in response to the pressure differential between the inlet and outlet ports 204, 206.

Figure 3:
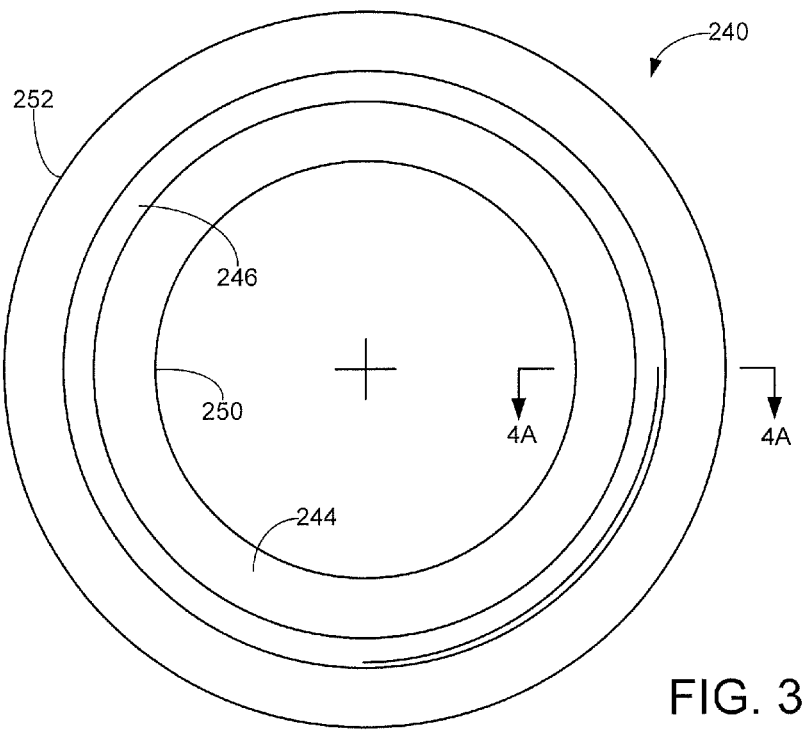
FIG. 3 shows a top plan view of a sealing member of the valves of FIGS. 1-2.

FIG. 3 shows the lower sealing member 240 from FIGS. 2A-2B in greater detail. The upper sealing member 238 may be nominally identical to the lower sealing member 240, or may have different dimensions and/or shape characteristics. The sealing member 240 is formed of a suitable elastomeric material compatible with the clean service application and includes an annular body portion 244 with a substantially rectangular cross-section.

Figure 4A:
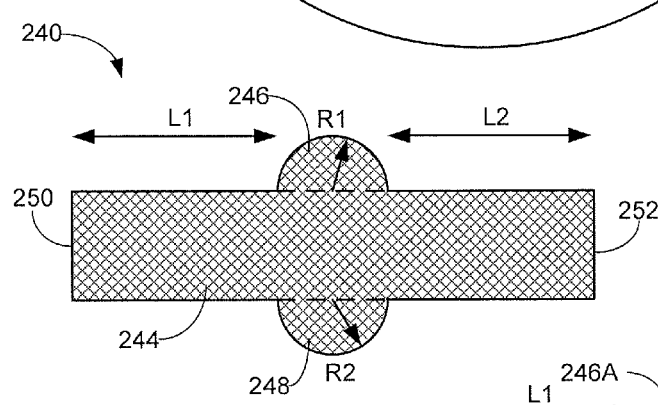
FIG. 4A is a cross-sectional representation of the sealing member along line 4A-4A in FIG. 3.

Upper and lower radiused projections 246, 248 extend from the annular body portion 244, as represented in FIG. 4A. The radiused projections 246, 248 each have a half-circle hemispheric cross-sectional shape, although other shapes can be used. The upper and lower radiused projections 246, 248 are axially aligned as shown. Axially aligned projections can help ensure proper alignment of the seal since it will not matter which side is up during installation.

An interior sidewall 250 of the sealing member 240 is configured to contactingly engage the outer cylindrical sidewall 236 of the piston 232. An exterior sidewall 252 of the sealing member 240 may similarly engage an interior surface of the clamp ring 226.

The respective distances from the inner sidewall 236 to the projections 246, 248 is denoted in FIG. 4A as distance L1. The respective distances from the outer sidewall 252 to the projections 246, 248 is denoted as distance L2. L2 is shown to be nominally equal to L1 (e.g., L1=L2), but such is merely exemplary and not required; for example, the sealing member is alternatively shown in FIGS. 2A-2B such that L1>L2.

Similarly, the radius R2 is shown in FIG. 4A to be nominally equal to R1 (e.g. R1=R2), but this is also merely exemplary and not required. For example, R1 may be greater than or smaller than R2. Moreover, one side may have a first shape (e.g., circular as shown) and the other side may have a projection with some other shape (e.g., rectilinear, etc.). While the interior and exterior sidewalls 250, 252 are shown to be flat, other shapes, such as radiused (circular) shapes, can be used as desired.

Figure 4B:
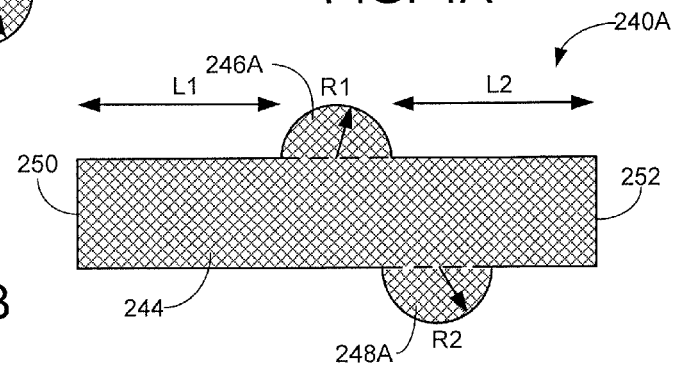
FIG. 4B is a cross-sectional representation of an alternative configuration for the sealing member of FIG. 3.

FIG. 4B illustrates an alternative sealing ring 240A. The sealing ring 240 is similar to the ring 240 in FIG. 4A except that upper and lower projections 246A, 248A are axially offset. As noted above, it is contemplated that axially aligning the projections as in FIG. 4A will tend to allow the seal to be reversible, provided that the projections each share a common size and/or shape. An offset configuration as in FIG. 4B presents a seal that only fits "one-way," which can be useful in applications where different sizes, shapes, diameters, etc. of the projections and/or the associated housing members are used.

It is contemplated that the sealing members 238, 240 will be reusable, so that the sealing members can be reinstalled and reused in a given application after disassembly and cleaning operations have been performed. Alternatively, the seals can be configured as one-time use items so that after an overpressure event, the main housing components can be subjected to appropriate cleaning operations and new, sterile sealing members can be installed.

Figure 5:
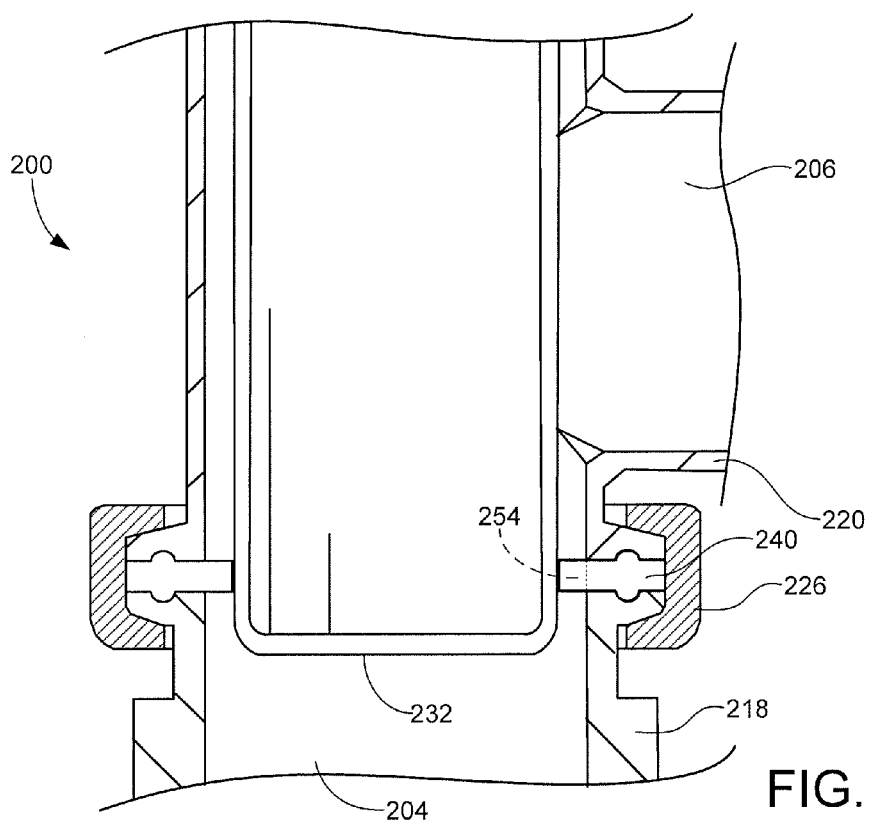
FIG. 5 shows aspects of FIG. 2A in greater detail.

FIG. 5 depicts the lower sealing member 240 in its installed position. It can be seen that an inner distal end portion 254 of the sealing member 240 projects from the housing members 218, 220 and into the interior of the main body 202. The relative distance of projection of the end portion 254 may be sized in relation to the thickness of the sealing member 240 to ensure durability and sealing effectiveness. For example, it can be seen that the axial thickness of the sealing member 240 (vertical dimension) is greater than the length of the end portion 254 (horizontal dimension). Again, this is merely exemplary and not necessarily limiting.

Figure 6:
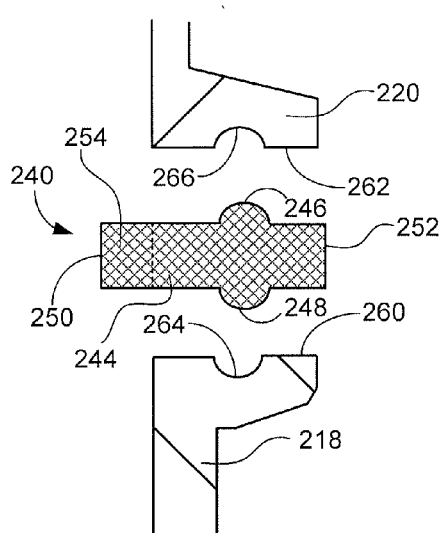
FIG. 6 is an exploded representation of components shown in FIG. 5.

FIG. 6 shows aspects of FIG. 5 in a partially exploded representation. The mating housing members, in this case the upper end of the lower housing member 218 and the lower end of the intermediate housing member 220, are provided with flat seating surfaces 260, 262 and associated annular grooves 264, 266. The flat seating surfaces 260, 262 are configured to contactingly engage and seal against the main body portion 244 of the sealing member 240. The grooves 264, 266 are configured to contactingly receive the radiused projections 246, 248. Other shapes for both the seating surfaces and the grooves can be used, and the seal configuration can be conformed thereto as required.

Figure 7:
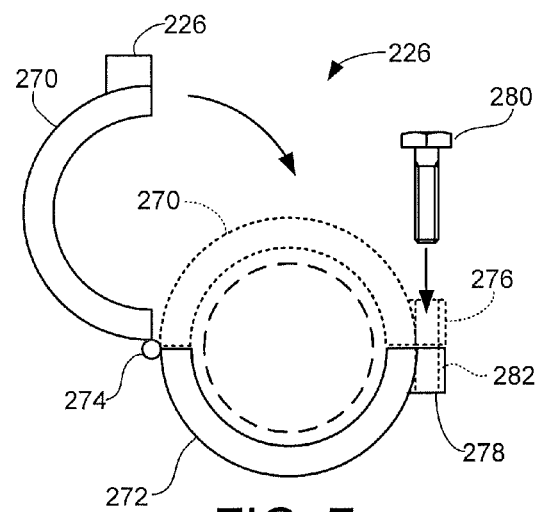
FIG. 7 generally depicts operation of a coupling mechanism of the valves of FIGS. 1-2 in accordance with some embodiments.

FIG. 7 is a schematic representation of the clamping ring 226 from FIG. 5. Generally, the clamping ring 226 includes two clamp segments 270, 272 which are respectively rotatable via an intervening hinge 274. Once the sealing member 240 is properly located between the respective housing members 218, 220 (See FIGS. 5-6), the segments 270, 272 are opened, slipped around the circumference of the sealing member 240 and closed so as to bring distal ends 276, 278 into alignment.

A fastener such as 280 can thereafter be used to secure the distal ends 276, 278 and apply a suitable compressive force upon the sealing member 240 by engaging internal threads 282 in the respective clamp segments 270, 272. The particular configurations of the clamp segments 270, 272, the distal ends 276, 278 and the fastener 280 can vary as required. In some cases, a finger-operated fastener may be used as depicted in FIG. 1. It is contemplated albeit not necessarily required that the clamp 226 contactingly engages the outermost surface (e.g., surface 252) of the sealing member 240 (and similarly for sealing member 238).

Accordingly, the exemplary clean service pressure relief valves 100, 200 disclosed herein can operate in a sterile or other clean environment. The elastomer sealing members 238, 240 provide a novel, efficient construction that provides improved sealing due to the increased surface area contact between the sealing member and the respective housing members. The additional surface area provided by projections 246, 248 provides a tortuous path for the fluid to pass from one end of the sealing member to the other end. No o-ring type grooves are supplied to trap bacteria or contaminants.

The various housing and valve components can be formed of a suitable material such as 304 or 316 stainless steel. The valve can be downstream balanced and thus senses only upstream pressures, and downstream containment pressures will not change the set pressure at which the valve opens. It has been found that the disclosed valves can have an accurate setpoint of about +/−5% or less, and set pressures as low as about 2 pounds per square inch (psi) can be achieved.

The collapsible pin 110, 210 provides accurate and consistent opening performance. The pin is external to the interior flow of the pressurized clean service fluid and therefore the valve does not need to be opened in order to change the pin. Installation of a new replacement pin can be accomplished in seconds.

Other benefits of the valve include a visual indication of open position (e.g., a bent pin as in FIG. 2B). A fast opening time (usually within milliseconds) can be provided, and the valve is substantially unaffected by pulsating pressures or changes in ambient temperatures. Very precise set points can be established.

The radiused projections 246, 248 on the sealing members 238, 240 help to ensure proper alignment of the sealing member relative to the housing members, and vice versa, as well as to ensure centering of the sealing member with respect to the piston. This can be particularly useful in a clean service application where disassembly and reassembly of the valve may be required from time to time to meet regulatory requirements. It will be appreciated, however, that the various valve configurations can also be used in "non-clean" environments, due to the ease of disassembly. For example, valves can be easily disassembled and reassembled with different internal and/or external components to meet a variety of different operational environments.

It is contemplated that the seals may be reused after a disassembly and cleaning/sanitizing operation, or new seals may be provided for use each time. The seals facilitate precise overpressure control and subsequent maintenance operations to reset a triggered relief valve. The three-piece construction of the illustrative embodiments allows for quick disassembly, sterilization/sanitizing and reassembly.

While three-piece housings have been illustrated, any number of housing components can be used, including housings that use two mating housing components and a single intervening seal, housings with more than three housing components and additional seals, etc. In some cases, N housing components can be used with N−1 intervening sealing members of common or different configurations.

As used herein, the term "clean service" and the like will be understood consistent with the foregoing discussion to describe an operational environment with specified regulatory requirements concerning contaminant levels, such as but not limited to the food service, dairy, pharmaceutical, medical, chemical and other industries. While the transport of pressurized liquids has been contemplated, other forms of fluids such as gasses and mixtures of gas and liquid can be transported. Any number of operational temperatures are envisioned, including relatively cold (e.g., liquid nitrogen) and relatively hot (e.g., steam) applications are envisioned.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a ring-shaped sealing member comprising an annular main body portion with an innermost surface at an innermost diameter, an outermost surface at an outermost diameter, opposing top and bottom flat surfaces which respectively extend between the innermost surface and the outermost surface, an annular first projection which extends away from the top flat surface in a first direction, and an annular second projection which extends away from the bottom flat surface in an opposing second direction, the innermost surface of the sealing member forming a cylindrically shaped sealing surface, the apparatus further comprising a movable valve member having a cylindrically shaped wall that contactingly engages the innermost surface to establish a fluidic seal, the apparatus further comprising first and second housing components of a valve assembly between which the sealing member is compressingly disposed to form a fluidic seal, the first housing component having a first base surface which contactingly engages the top flat surface of the sealing member and a first annular groove into which the annular first projection contactingly extends, the second housing component having a second base surface which contactingly engages the bottom flat surface of the sealing member and a second annular groove into which the annular second projection contactingly extends, the apparatus further comprising a main body formed from the first and second housing components and a moveable piston arranged for axial movement within the main body, the moveable piston having an outer cylindrical surface contactingly engaging the innermost surface of the sealing member, the apparatus further comprising a clamp ring which engages flanges on the first and second housing components on opposing sides of the sealing member to apply a compressive force upon the sealing member and establish the fluidic seal.

2. The apparatus of claim 1, in which the annular main body portion has a rectilinear cross-sectional shape.

3. The apparatus of claim 2, in which the first and second projections each have a circular cross-sectional shape.

4. The apparatus of claim 1, in which the first projection is axially aligned with the second projection.

5. The apparatus of claim 1, in which the first projection is axially offset with respect to the second projection.

6. The apparatus of claim 1, in which the first and second projections are nominally centered between the innermost surface and the outermost surface so that a first distance from a centerpoint of each of the first and second projections to the innermost surface is nominally equal to a second distance from the centerpoint of each of the first and second projections to the outermost surface.

7. An apparatus comprising:
a first housing component;
a second housing component; and
an annular ring-shaped sealing member comprising an annular main body portion with an innermost surface, an outermost surface, opposing top and bottom flat surfaces, an annular first projection which extends from the top flat surface, and an annular second projection which extends from the bottom flat surface, the sealing member compressingly engaged between an upper annular extent of the first housing component and a lower annular extent of the second housing component to form a sealed housing;
a moveable piston arranged to axially move within the first and second housing components, the piston comprising a cylindrical outer surface which sealingly engages the innermost surface of the sealing member to form a fluidic seal, the apparatus characterized as a clean service pressure relief valve comprising an inlet port and an outlet port, the cylindrical outer surface of the piston sealing engaging the innermost surface of the sealing member to form the fluidic seal between the inlet port and the outlet port to provide a normally closed valve; and
a mechanically collapsible member connected to the moveable piston, wherein responsive to a pressure of a pressurized fluid proximate the inlet port reaching a predetermined threshold, the piston moves axially away from the inlet port and mechanically collapses the mechanically collapsible member to transition the valve to an open position that fluidically couples the inlet port to the outlet port, wherein the cylindrical outer surface slides along and then disengages from the innermost surface of the sealing member during transitioning to the open position.

8. The apparatus of claim 7, further comprising a clamp ring which surrounds the sealing member to compressingly engage the first and second housing components to secure the second housing component to the first housing component and to compress the sealing member therebetween.

9. The apparatus of claim 8, further comprising a threaded fastener which engages a corresponding set of threads of the clamp ring.

10. The apparatus of claim 7, wherein the annular ring-shaped sealing member is a first sealing member, and wherein the apparatus further comprises:
a third housing component axially aligned with the first and second housing components; and
a second annular ring-shaped sealing member comprising an annular main body portion with an innermost surface, an outermost surface, opposing top and bottom flat surfaces, an annular first projection which extends from the top flat surface, and an annular second projection which extends from the bottom flat surface, the second sealing member compressingly engaged between an upper annular extent of the second housing component and a lower annular extent of the third housing component to form the sealed housing.

11. A clean service valve, comprising:
a housing defining an inlet port, an outlet port and an interior fluidic passage therebetween, the housing comprising:
a first housing component; and
a second housing component;
an annular ring-shaped sealing member comprising an annular main body portion with an innermost surface, an outermost surface, opposing top and bottom flat surfaces, an annular first projection which extends from the top flat surface, and an annular second projection which extends from the bottom flat surface, the sealing member compressingly engaged between an upper annular extent of the first housing component and a lower annular extent of the second housing component;
a valve assembly disposed within the housing comprising a piston moveable between a normally closed position and a bypass open position, the piston having a cylindrical outer surface which sealingly engages the innermost surface of the sealing member to form a fluidic seal in the normally closed position; and
a mechanically collapsible member connected to the moveable piston, wherein responsive to a pressure of a pressurized fluid proximate the inlet port reaching a predetermined threshold, the piston moves axially away from the inlet port and mechanically collapses the mechanically collapsible member to transition the valve to the open position, wherein the cylindrical outer surface slides along and then disengages from the innermost surface of the sealing member during transitioning to the open position.

12. The apparatus of claim 11, further comprising:
a clamp ring assembly comprising first and second hinged clamp segments which surround and contactingly engage corresponding flanges on the first and second housing components and the outermost surface of the sealing member, and a fastener which threadingly engages the respective first and second housing components to apply a compressive force upon the sealing member to establish the fluidic seal.

* * * * *